(12) United States Patent
Baert et al.

(10) Patent No.: US 12,371,379 B2
(45) Date of Patent: *Jul. 29, 2025

(54) PANEL AND METHOD FOR PRODUCING A PANEL

(71) Applicant: Champion Link International Corporation, The Valley (AL)

(72) Inventors: Thomas Luc Martine Baert, Sint-Martens-Latem (BE); Tom Van Poyer, Jiaxing (CN); Sven Boon, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 0 days.

This patent is subject to a terminal disclaimer.

(21) Appl. No.: 18/347,758

(22) Filed: Jul. 6, 2023

(65) Prior Publication Data

US 2023/0347685 A1 Nov. 2, 2023

Related U.S. Application Data

(63) Continuation of application No. 16/951,002, filed on Nov. 18, 2020, now Pat. No. 11,724,537, which is a
(Continued)

(30) Foreign Application Priority Data

May 26, 2020 (NL) ...................... 2025684

(51) Int. Cl.
| | |
|---|---|
| C04B 28/10 | (2006.01) |
| B28B 1/52 | (2006.01) |
| B28B 11/00 | (2006.01) |
| B28B 19/00 | (2006.01) |
| B32B 3/06 | (2006.01) |
| B32B 5/14 | (2006.01) |
| B32B 9/02 | (2006.01) |
| B32B 13/02 | (2006.01) |
| B32B 13/04 | (2006.01) |
| B32B 13/10 | (2006.01) |
| B32B 13/12 | (2006.01) |
| B32B 21/14 | (2006.01) |
| B44C 5/04 | (2006.01) |
| C04B 18/26 | (2006.01) |

(Continued)

(52) U.S. Cl.
CPC ............ *C04B 28/105* (2013.01); *B28B 1/522* (2013.01); *B28B 1/525* (2013.01); *B28B 11/001* (2013.01); *B28B 19/0092* (2013.01); *B32B 3/06* (2013.01); *B32B 5/145* (2013.01); *B32B 9/02* (2013.01); *B32B 13/02* (2013.01); *B32B 13/04* (2013.01); *B32B 13/10* (2013.01); *B32B 13/12* (2013.01); *B32B 21/14* (2013.01); *B44C 5/04* (2013.01); *C04B 18/26* (2013.01); *C04B 28/30* (2013.01); *C04B 28/32* (2013.01); *C04B 40/0259* (2013.01); *E04C 2/04* (2013.01); *E04C 2/06* (2013.01); *E04C 2/46* (2013.01); *E04C 2/50* (2013.01); *E04F 15/08* (2013.01); *E04F 15/107* (2013.01); *B28B 3/02* (2013.01); *B32B 13/08* (2013.01); *B32B 29/06* (2013.01); *B32B 2260/026* (2013.01); *B32B 2260/028* (2013.01); *B32B 2260/046* (2013.01); *B32B 2262/065* (2013.01); *B32B 2262/067* (2013.01); *B32B 2262/08* (2013.01); *B32B 2307/546* (2013.01); *B32B 2307/722* (2013.01); *B32B 2307/732* (2013.01); *B32B 2419/04* (2013.01); *B32B 2451/00* (2013.01); *B32B 2607/00* (2013.01); *C04B 18/248* (2013.01); *C04B 2111/00612* (2013.01); *E04C 2002/004* (2013.01); *E04F 15/02038* (2013.01); *Y02W 30/91* (2015.05); *Y10T 428/24777* (2015.01); *Y10T 428/24942* (2015.01); *Y10T 428/2495* (2015.01); *Y10T 428/24967* (2015.01); *Y10T 428/24992* (2015.01)

(58) Field of Classification Search
None
See application file for complete search history.

(56) References Cited

U.S. PATENT DOCUMENTS

| | | |
|---|---|---|
| 1,443,097 A | 1/1923 | Sinnett |
| 2,332,703 A | 10/1943 | Elmendorf |
| (Continued) | | |

FOREIGN PATENT DOCUMENTS

| | | |
|---|---|---|
| CN | 1099366 | 3/1995 |
| CN | 1541971 | 11/2004 |
| (Continued) | | |

OTHER PUBLICATIONS

Machine Translation of CN-103588462-A, Feb. 2014 (Year: 2014).*
(Continued)

*Primary Examiner* — Jeffrey A Vonch
(74) *Attorney, Agent, or Firm* — Heslin Rothenberg Farley & Mesiti P.C.

(57) ABSTRACT

The invention relates to a panel and a method for producing a panel. The panel is in particular a floor, wall or ceiling panel, and comprises at least one core layer, the core layer comprising an upper core surface and a lower core surface and at least one pair of opposite side edges; wherein the core layer comprises magnesium oxide cement; wherein the core has a density which is substantially homogenous over its entire volume, and wherein at least one decorative top layer is attached to an upper core surface of the core layer.

20 Claims, No Drawings

Related U.S. Application Data continuation-in-part of application No. 16/896,343, filed on Jun. 9, 2020, now Pat. No. 11,624,192.

(51) Int. Cl.

| | | |
|---|---|---|
| C04B 28/30 | (2006.01) | |
| C04B 28/32 | (2006.01) | |
| C04B 40/02 | (2006.01) | |
| E04B 2/00 | (2006.01) | |
| E04B 5/02 | (2006.01) | |
| E04C 2/04 | (2006.01) | |
| E04C 2/06 | (2006.01) | |
| E04F 15/08 | (2006.01) | |
| E04F 15/10 | (2006.01) | |
| B28B 3/02 | (2006.01) | |
| B32B 13/08 | (2006.01) | |
| B32B 29/06 | (2006.01) | |
| C04B 18/24 | (2006.01) | |
| C04B 111/00 | (2006.01) | |
| E04C 2/00 | (2006.01) | |
| E04F 15/02 | (2006.01) | |

(56) References Cited

U.S. PATENT DOCUMENTS

| | | |
|---|---|---|
| 2,697,677 A | 12/1954 | Elmendorf |
| 2,724,655 A | 11/1955 | Williams |
| 2,944,291 A | 10/1957 | Prior et al. |
| 3,245,867 A | 4/1966 | Clarke |
| 3,421,597 A | 1/1969 | Blau |
| 3,667,978 A | 6/1972 | Vassilevsky |
| 3,719,512 A | 3/1973 | Danielis |
| 3,788,870 A | 1/1974 | Verth |
| 3,931,428 A | 1/1976 | Reick |
| 4,003,752 A | 1/1977 | Isohata |
| 4,150,185 A | 4/1979 | Prymelski |
| 4,242,163 A | 12/1980 | Nakajima |
| 4,278,728 A | 7/1981 | Honda |
| 4,315,967 A | 2/1982 | Prior |
| 4,339,362 A | 7/1982 | Pascau |
| 4,820,345 A | 4/1989 | Berg |
| 5,049,197 A | 9/1991 | Brown |
| 5,336,551 A | 8/1994 | Graiver |
| 5,631,053 A | 5/1997 | Andersen |
| 5,767,178 A | 6/1998 | Kolker |
| 5,776,580 A | 7/1998 | Rasmussen |
| 5,958,130 A | 9/1999 | Stroeml |
| 6,260,326 B1 | 7/2001 | Muller-Hartburg |
| 6,319,579 B1 | 11/2001 | Strandgaard |
| 6,688,061 B2 | 2/2004 | Garcia |
| 6,761,794 B2 | 7/2004 | Mott |
| 6,933,043 B1 | 8/2005 | Son |
| 7,255,907 B2 | 8/2007 | Feigin et al. |
| 7,399,510 B2 | 7/2008 | Dupouy |
| 7,866,103 B2 | 1/2011 | Marschke |
| 7,918,062 B2 | 4/2011 | Chen |
| 8,287,991 B2 | 10/2012 | Donelson |
| 8,419,877 B2 | 4/2013 | Pervan |
| 10,167,230 B1 | 1/2019 | Wambaugh |
| 10,328,680 B2 | 6/2019 | Pervan |
| 10,759,697 B1 | 9/2020 | Lukkarila |
| 10,828,881 B2 | 11/2020 | Bergelin |
| 11,053,696 B1 | 7/2021 | Baert |
| 2003/0233809 A1 | 12/2003 | Pervan |
| 2004/0265555 A1 | 12/2004 | Tang |
| 2005/0013984 A1 | 1/2005 | Dijk |
| 2005/0193661 A1 | 9/2005 | Van Elten |
| 2005/0208258 A1 | 9/2005 | Hosokawa |
| 2005/0286397 A1 | 12/2005 | Inagaki |
| 2006/0115442 A1 | 6/2006 | Katz |
| 2007/0033891 A1 | 2/2007 | Imbabi |
| 2007/0246864 A1 | 10/2007 | Utagaki |
| 2008/0050556 A1 | 2/2008 | Van Elten |
| 2008/0149137 A1 | 6/2008 | Steinbrenner |
| 2008/0314296 A1 | 12/2008 | Wisenbaker |
| 2008/0318004 A1 | 12/2008 | Ruhe |
| 2009/0011279 A1 | 1/2009 | Wisenbaker, Jr. et al. |
| 2009/0017320 A1 | 1/2009 | Donelson |
| 2009/0155612 A1 | 6/2009 | Pervan |
| 2009/0235607 A1 | 9/2009 | Chen |
| 2009/0308001 A1 | 12/2009 | Wu |
| 2010/0031593 A1 | 2/2010 | Klose |
| 2010/0081008 A1 | 4/2010 | Trout |
| 2010/0115974 A1 | 5/2010 | Okaza |
| 2011/0067336 A1 | 3/2011 | McDonald |
| 2011/0070410 A1 | 3/2011 | Huang |
| 2011/0088597 A1 | 4/2011 | Wu |
| 2011/0244191 A1 | 10/2011 | Asakura |
| 2011/0290155 A1 | 12/2011 | Masopoulos |
| 2013/0295346 A1 | 11/2013 | Ferguson |
| 2014/0057066 A1 | 2/2014 | Cai |
| 2014/0087156 A1 | 3/2014 | Sarkis |
| 2014/0134402 A1 | 5/2014 | Pallon |
| 2014/0272302 A1 | 9/2014 | Ciuperca |
| 2015/0059621 A1 | 3/2015 | Hauber |
| 2015/0121793 A1 | 5/2015 | Segeart |
| 2015/0314564 A1 | 11/2015 | Mancini |
| 2016/0158963 A1 | 6/2016 | Chu |
| 2016/0159032 A1 | 6/2016 | Chu |
| 2016/0214395 A1 | 7/2016 | Torfs |
| 2016/0288447 A1 | 10/2016 | Cordeiro |
| 2016/0369507 A1 | 12/2016 | Pervan |
| 2016/0375674 A1 | 12/2016 | Schulte |
| 2017/0204616 A1 | 7/2017 | Scholz |
| 2017/0217133 A1 | 8/2017 | Jordan et al. |
| 2018/0002932 A1 | 1/2018 | Van Giel |
| 2018/0093448 A1 | 4/2018 | Marksell |
| 2018/0147873 A1 | 5/2018 | De Mondt |
| 2018/0258651 A1 | 9/2018 | Meersseman |
| 2018/0265409 A1 | 9/2018 | Bugajski |
| 2018/0283014 A1 | 10/2018 | Hodgkins et al. |
| 2019/0100651 A1 | 4/2019 | Pineli |
| 2019/0264449 A1 | 8/2019 | Welbourn |
| 2019/0292793 A1 | 9/2019 | Van Vlassenrode |
| 2019/0308914 A1 | 10/2019 | Kong |
| 2019/0383031 A1 | 12/2019 | Baert |
| 2020/0039190 A1 | 2/2020 | Lenaerts |
| 2020/0047469 A1 | 2/2020 | Fang |
| 2020/0080321 A1 | 3/2020 | Baert |
| 2020/0123788 A1 | 4/2020 | Baert |
| 2020/0131784 A1 | 4/2020 | Boucke |
| 2020/0140335 A1 | 5/2020 | Brown |
| 2020/0207118 A1 | 7/2020 | Lenaerts |
| 2020/0207662 A1 | 7/2020 | Kipfelsberger |
| 2020/0218415 A1 | 7/2020 | Jang |
| 2020/0223986 A1 | 7/2020 | Van Gilst |
| 2020/0263440 A1 | 8/2020 | Chen |
| 2020/0284049 A1 | 9/2020 | De Rick |
| 2020/0308846 A1 | 10/2020 | Josefsson |
| 2021/0214279 A1 | 7/2021 | Wambaugh |
| 2021/0221166 A1 | 7/2021 | Schacht |
| 2021/0237402 A1 | 8/2021 | Baert |
| 2021/0355688 A1 | 11/2021 | Boo |
| 2021/0387436 A1 | 12/2021 | Nilsson |
| 2021/0388623 A1 | 12/2021 | Nilsson |
| 2022/0018140 A1 | 1/2022 | Boucke |
| 2022/0074212 A1 | 3/2022 | Boucke |
| 2022/0090391 A1 | 3/2022 | Nilsson |

FOREIGN PATENT DOCUMENTS

| | | |
|---|---|---|
| CN | 1548396 | 11/2004 |
| CN | 1861352 | 11/2006 |
| CN | 100419019 | 2/2007 |
| CN | 101003990 | 7/2007 |
| CN | 101386516 | 3/2009 |
| CN | 102225569 | 10/2011 |
| CN | 202359769 | 8/2012 |
| CN | 202391062 | 8/2012 |
| CN | 102674791 | 9/2012 |
| CN | 102864893 | 1/2013 |
| CN | 103304258 | 9/2013 |

(56) References Cited

FOREIGN PATENT DOCUMENTS

| | | | | |
|---|---|---|---|---|
| CN | 203271021 | | 11/2013 | |
| CN | 103459145 | A | 12/2013 | |
| CN | 103467059 | | 12/2013 | |
| CN | 103588462 | | 2/2014 | |
| CN | 103588462 | A * | 2/2014 | |
| CN | 104016655 | | 9/2014 | |
| CN | 104788057 | | 7/2015 | |
| CN | 105110743 | | 12/2015 | |
| CN | 105130350 | | 12/2015 | |
| CN | 105753428 | | 7/2016 | |
| CN | 106082929 | A | 11/2016 | |
| CN | 106193507 | | 12/2016 | |
| CN | 106242489 | | 12/2016 | |
| CN | 106738201 | | 5/2017 | |
| CN | 106968413 | | 7/2017 | |
| CN | 106995303 | A * | 8/2017 | |
| CN | 107311602 | | 11/2017 | |
| CN | 107311602 | A * | 11/2017 | |
| CN | 108238778 | | 7/2018 | |
| CN | 109516761 | A | 3/2019 | |
| CN | 109868971 | A * | 6/2019 | |
| CN | 110451919 | | 11/2019 | |
| CN | 110607893 | | 12/2019 | |
| CN | 110746174 | | 2/2020 | |
| CN | 110770405 | | 2/2020 | |
| CN | 111055364 | | 4/2020 | |
| DE | 2451667 | | 5/1976 | |
| DE | 2550857 | | 5/1977 | |
| DE | 3042157 | | 5/1982 | |
| DE | 3506555 | | 8/1986 | |
| DE | 3915628 | | 10/1990 | |
| DE | 202005020617 | U1 * | 6/2006 | ............ B32B 13/02 |
| DE | 102012000468 | | 7/2013 | |
| EP | 867573 | | 9/1998 | |
| EP | 1026341 | | 8/2000 | |
| EP | 2025823 | | 2/2009 | |
| EP | 2060389 | | 5/2009 | |
| EP | 2468698 | A1 * | 6/2012 | ............ C04B 14/42 |
| EP | 2690142 | | 1/2014 | |
| EP | 3536874 | | 9/2019 | |
| GB | 1486870 | | 9/1977 | |
| GB | 1527624 | | 10/1978 | |
| GB | 1562154 | | 3/1980 | |
| JP | 01096049 | | 4/1989 | |
| JP | 02175643 | | 7/1990 | |
| JP | H0828015 | | 1/1996 | |
| JP | 08229913 | | 9/1996 | |
| JP | 10231160 | A * | 9/1998 | |
| JP | 10279344 | | 10/1998 | |
| JP | 2000094418 | A * | 4/2000 | |
| JP | 2008279713 | | 11/2008 | |
| JP | 2013158946 | | 8/2013 | |
| JP | 2013159917 | | 8/2013 | |
| KR | 20140066086 | | 5/2014 | |
| RU | 2005108 | C1 * | 12/1993 | |
| RU | 1751968 | | 2/1994 | |
| RU | 2014307 | | 6/1994 | |
| RU | 2014307 | C1 * | 6/1994 | |
| RU | 2199503 | | 2/2003 | |
| SE | 19503648 | | 3/2019 | |
| SU | 1054388 | A1 * | 11/1983 | |
| SU | 1143725 | | 3/1985 | |
| SU | 1493633 | | 7/1989 | |
| SU | 1746873 | | 7/1992 | |
| WO | WO-9610477 | A1 * | 4/1996 | ............ B01F 3/1214 |
| WO | WO-9932416 | A1 * | 7/1999 | ............ C04B 18/28 |
| WO | WO-0036218 | A1 * | 6/2000 | ............ B32B 5/16 |
| WO | 2012061300 | | 5/2012 | |
| WO | WO-2012084984 | A1 * | 6/2012 | ............ C04B 14/42 |
| WO | 2012139513 | | 10/2012 | |
| WO | 2014007738 | | 1/2014 | |
| WO | 2018234561 | | 12/2018 | |
| WO | 2019064113 | | 4/2019 | |
| WO | 2020114645 | | 6/2020 | |
| WO | 2020161609 | | 8/2020 | |
| WO | 2020197475 | | 10/2020 | |
| WO | 2020259736 | | 12/2020 | |
| WO | 2021123318 | | 6/2021 | |
| WO | 2021165769 | | 8/2021 | |

OTHER PUBLICATIONS

Machine Translation of CN-107311602-A, Nov. 2017 (Year: 2017).*
Hossain et al., Mechanical, durability and environmental aspects of magnesium oxychloride cement boards incorporating waste wood, Jan. 2019, Journal of Cleaner Production, vol. 207, pp. 391-399 (Year: 2019).*
Machine Translation of SU-1143725-A1, 003/1985 (Year: 1985).*
International Search Report and Written Opinion of corresponding Application No. NL 2025119 mailed Jan. 14, 2021.
International Search Report and Written Opinion of corresponding PCT Application No. NL2025684, mailed Mar. 3, 2021.
International Search Report and Written Opinion for corresponding App. No. NL 2024807 issued Sep. 18, 2020.
International Search Report and Written Opinion for corresponding App. No. NL 2024806 issued Nov. 26, 2020.
International Search Report and Written Opinion for corresponding PCT App. No. NL 2024805 issued Sep. 23, 2020.

* cited by examiner

PANEL AND METHOD FOR PRODUCING A PANEL

The invention relates to a panel, in particular a floor, wall or ceiling panel. The invention also relates to a method for producing a panel, in particular a floor, wall or ceiling panel.

Magnesium oxide (MgO) based floor panels offer an alternative solution to oriented strand board or plywood-based construction materials. The panels are popular due to their high load capacity. Currently known magnesium oxide based panels, are conventionally produced by forming a mixture, typically in the form of a slurry, of a combination of substances including magnesium compounds, additives, water and other materials; pouring said mixture layer by layer in a container, typically a mould; reinforcing the moulded composition by adding reinforcing materials at least between two layers or approximate one surface; curing the mixture in a conditioned room at controlled temperature and moisture; demoulding the dried mixture from the mould once optimal curing is achieved; and cutting said mixture into the desired shape of the panel. In most cases, the mixture used in the conventional process usually contains a lot of brine thereby requiring a lot of water. This entails conditioning of the panel to about two weeks or more until optimal condition is achieved; whilst requiring a significant amount of heat to maintain optimal curing conditions. There are several problems with the current process including that it is costly and overly time consuming; as well with the resulting panel, as it requires the addition of reinforcing layers that are often composed of non-natural materials such as fiberglass or plastics, it is easily degraded under conditions of high temperature and/or high moisture, it lacks the flexibility required for complementary coupling means, and it features a density gradient which makes it unsuitable for use as a flooring panel. In addition, due to the presence of this density gradient, the panel will warp or break when further subjected to processes that require high temperature and/or high pressure, thereby preventing the direct lamination of a decorative layer and/or balancing layer on an upper and/or lower surface of the panel.

It is an object of the invention to provide a panel, in particular a decorative building panel, such as a wall, flooring or ceiling panel and/or a method of producing such panel, which at least partially overcomes the above-mentioned disadvantages of the prior art.

The invention provides thereto: a decorative panel, in particular a floor, wall or ceiling panel, comprising:
- at least one core layer comprising an upper core surface, a lower core surface and at least one pair of opposite side edges;
- preferably at least one decorative top layer attached to the upper core surface; wherein the core layer comprises magnesium oxide cement; and wherein the core layer has a density that is substantially homogeneous over the entire volume of the core layer.

The panel according to the present invention benefits of a density which is significantly higher than conventional magnesium oxide based panels. Due the core layer comprising magnesium oxide cement and due to the core layer having a density that is substantially homogeneous over the entire volume of the core layer a panel, in particular core layer of a panel, is obtained having a relatively good flexural and structural strength. This enables that the reinforcing layer in the core layer can be completely omitted. Magnesium oxide cement based panels according to the prior art often apply a fiberglass reinforcing layer in order to obtain a panel which is sufficiently strong. However, the use of fiberglass is undesired for various reasons. The fiberglass may eventually erode thereby posing a risk for the panel to weaken. Further, since fiberglass is not used, the core layer according to the present invention is found to be easier to mill and process, for example in order to provide complementary coupling means. The use of complementary coupling means is in practice challenging for a magnesium oxide cement based panel due to the brittleness of the material. Despite that several publications claim that interconnecting coupling means, in particular interconnecting coupling means configured for both horizontal and vertical locking, can be applied, this is in practice not feasible. Even the application of a simple tongue and groove combination is a severe challenge for conventional magnesium oxide cement based panels as the panels' brittle core composition tends to break, crack and/or rupture. Since the panel according to the present invention has an improved flexural and structural strength when compared to conventional magnesium oxide cement based panels, this sensitivity for damage, in particular due to brittleness and lack of flexibility, is overcome. This does not only enable the optional use of complementary coupling means, but also enables a larger freedom in practical application of the panel as such. Prior art panels are often limited for use as wall and/or ceiling panels, where the use as floor panel cannot be guaranteed due to its fragility. Conventional magnesium oxide cement panels are typically not sufficiently resistant for forces applied during (intensive) use and/or peak loads, which limitation is overcome by the present invention. The panel according to the present invention can be both configured for and suitable for use as floor panel.

The density of the core layer of a panel according to the present invention is substantially constant (or homogeneous) over the entire volume of the core layer. Hence, the core layer is substantially homogeneous over the entire volume of the core layer. The core layer is in particular free of any regions and/or zones having a comparatively increased or decreased density. The core layer is in particular of a consistent density throughout its volume allowing for at least one layer of impregnated paper, or lignocellulose impregnated with a resin to be hot pressed in the upper and lower surfaces of the panel without causing the panel to warp or bend despite the core layer comprising magnesium oxide cement.

As indicated, the density of the core layer is substantially homogeneous over the entire volume of the core layer. However, it is conceivable that the density of on some regions of the core, in particular on outer regions near or at the upper core surface and/or lower core surface, is slightly increased due to being subjected to a pressing process. It is also conceivable that there is difference in densities of the outer regions from the density of the inner region of the core, in particular within 15%, more preferably within 10%, most preferably within 5% difference. For example, at least one upper region of the core layer and/or at least one lower region of the core layer could have a density that is less than 15%, more preferably less than 10%, most preferably less than 5% higher than the average density of the (entire) core layer. It is also conceivable that proximate an upper region of the core layer and/or proximate a lower region of the core layer could have a density that is less than 15%, more preferably less than 10%, most preferably less than 5% higher than the average density of the (entire) core layer. It is conceivable that the outer regions are at least about 0.1 mm to about 3 mm, more preferably at least about 0.1 mm to about 1.5 mm, most preferably at least about 0.1 mm to about 0.6 mm from the inner region of the core. For example, the upper region and/or the lower region extends into the core layer for about 0.1 mm to about 3 mm, preferably about 0.1 to about 1.5 mm, more preferably at least 0.1 mm to about 0.6 mm from the upper core surface and/or the lower core surface. It is also possible that the densities in the upper region of the core layer and the lower region of the core layer are substantially similar.

As indicated, the panel according to the present invention benefits of a good flexural and structural strength. In addition that this contributes to the usability of the panel, the good flexural and structural strength further lowers the risk of damaging of the panel. Damage can for example occur in the form of cracking and/or splitting of the panel during use and/or handling. When compared to conventional MgO-based panels, the panel according to the present invention benefits of an enhanced modulus of rupture (MOR) and modulus of elasticity (MOE). This benefit can at least partially be explained by the relatively high density of the panel, which is explained by the lack of air bubbles or pockets within the magnesium composition. Magnesium oxide cement based panels according to the prior art, and in particular the core layer of such panel, typically have a density between 600 and 1000 kg/m3. For specific embodiments of prior art magnesium oxide cement panels, densities of 1000 to 1200 kg/m3 have been observed, which is still considerably lower than the density of the core layer of the panel according to the present invention. Further, it is typically attempted to achieve a density as low as possible for magnesium oxide cement based panels due to relatively light panels being easier to handle for building purposes. To this end, prior art panels are even known to add low-weight additives such as polystyrene, pearlite and the like. The core layer preferably has a density in the range of 1350 kg/m3 to 1550 kg/m3. Surprisingly it was found that a magnesium oxide cement based core layer having a density of 1350 to 1550 kg/m3 has very usable characteristics for use in floor-, wall- and/or ceiling coverings.

Moreover, conventional panels produced according to the prior art generally comprise regions having locally an increased and/or decreased density. The increased and/or decreased density regions observed in prior art panels are typically obtained by a conventional production process using excessive water and/or by the use of integrated reinforcing layers. A conventional production process requires slow curing of the magnesium oxide cement, at no additional pressure, to form a board. The nature of the production process necessitates a sedimentation at the bottom surface of the boards during curing, and a higher density or crust at this point in the resulting cured core board. Likewise, any gasses formed during the chemical reactions and crystallization of the magnesium oxide slurry tend to float upward, thereby causing a lower density at the upper surface of the boards during curing, and a lower density at this point in the resulting core board. Weight reducing additives enhance this imbalance as they also float upward before the core board has fully cured. As a result, boards produced according to conventional methods have a density gradient with a comparatively high density at one surface, and a comparatively low density at the opposing surface. The density difference between upper and bottom (lower) surfaces is pronounced and can reach up to 30% difference. The imbalance of this construction make the panel unsuitable for use as a floor as the differing shrinking- and expansion rates under fluctuating moisture and temperature levels cause severe bending and warping of the panels that are unacceptable to international flooring standards ISO 10582 and ASTM F3261. Furthermore, due to the unbalanced construction and the presence of air bubbles and/or pockets in the board, the panel is not suitable for production methods that employ high temperature and pressure to bond a decorative layer to the core board to form a decorative panel. The core layer or core board according to the present invention features a consistent density throughout its volume and is exceptionally balanced, suited to serve as a flooring panel, and to be laminated with a decorative top layer preferably through a process employing high temperature and pressure, without warping or bending.

The combination of materials used in the core layers enables that the core layer has relatively good stability under high temperatures and/or high humidity. In fact, especially when compared to HDF panels and conventional MgO panels, the panel according to the present invention exhibits relatively high waterproof and heat resistant properties, meaning that the panel is more stable when in water thereby exhibiting less swelling and is also more tolerant to heat thereby exhibiting less shrinking. This effect makes the panels in particular suitable for use as a building material, such as for flooring, wall and/or ceiling panels. A further benefit of the use of natural fibres in the magnesium oxide cement is that this reduces the overall weight of the panel whilst and may also have a sound dampening effect.

The panel, and in particular the core layer, according to the present invention is preferably free of phenolic and/or thermoplastic resins. There is no need to use any resins, in particular phenolic and/or thermoplastic resins, as the panel according to the present invention already benefits of sufficient waterproofness. This is beneficial as in particular phenolic resins can be highly toxic, causing risks during the production process, but even after installation of the panels it is found that phenol can be emitted to the atmosphere for example due to moisture degradation of the panel.

Within the scope of the present invention, when it is referred to magnesium oxide cement it can also be referred to magnesia cement. The indication wt % indicates the percentage by weight.

In a preferred embodiment, the core layer comprises at least 30 wt % of natural fibres, wherein the natural fibres are preferably dispersed in the magnesium oxide cement. Due the combination of magnesium oxide cement comprising at least 30 wt % magnesium oxide and at least 20 wt % natural fibres and the core layer preferably having a density in the range of 1350 kg/m3 to 1550 kg/m3 a panel, in particular core layer of a panel, is obtained having a relatively good flexural and structural strength. This enables that the reinforcing layer in the core layer can be completely omitted. The use of natural fibres is also beneficial from economical point of view, as natural fibres are typically cheaper than fiberglass, or any other conventional reinforcing material. The panel according to the present invention in particular benefits of the high density due to its clever production method which allows for good encapsulating of the natural fibres within the magnesium oxide cement. Hence, the natural fibres in fact form a reinforcing network within the core layer. This can be at least partially explained by the panel, and in particular the core layer, being subjected to a relatively high pressure force of more than 7 Mpa during production. Also the efficient use of process water during production is found to contribute to the beneficial material properties of the final product. Where it is referred to natural fibres, also the term natural particles, fibrous chips and/or natural chips can be used within the scope of the present invention.

In a preferred embodiment of the panel according to the present invention, the average length of at least part of the natural fibres is at least 2 mm. It is beneficial to apply natural fibres having an average length of at least 2 mm as natural fibres having said length can positively contribute to the internal structure of the core layer. At least part of the natural fibres are typically encapsulated by the magnesium oxide cement, thereby forming a network of fibres dissipated over the entire core layer. Hence, the natural fibres in fact form a reinforcing network within the core layer. An average fibre length of at least 2 mm allows for good encapsulating of the fibres and for the provision of an effective reinforcing network.

Natural fibres having an average length below 2 mm cannot sufficiently contribute to improving the flexural and/or structural strength of the panel for specific purposed. The use of smaller fibres, such as dust and/or powder, will result in a relatively brittle panel which is prone to breaking. Further, this will also not allow application of interlocking coupling means for the panels. Hence, in order to be able to obtain the desired material properties for the magnesium oxide cement for the core layer, the at least 10 wt % of natural fibres having an average length of at least 2 mm is recommended. An average fibre length is mentioned, as natural fibres typically vary in their sizes, such as shape, length and/or diameter. It is conceivable that a, relatively small, fraction of natural fibres having a length below 2 mm present. It is also conceivable that the average length of at least part of the natural fibres is between 2 and 5 mm. In another preferred embodiment, the average length of at least part of the natural fibres is between 2 an 10 mm, in particular between 2.5 and 8 mm, more in particular between 3 and 5 mm. It is also conceivable that at least 50 wt % of the natural fibres dispersed in the magnesium oxide cement has an average length of at least 2 mm.

The natural fibres can for example be wood fibres, bamboo fibres, plant fibres, mycelium fibres and/or animal fibres. In a preferred embodiment, the natural fibres comprise lignocellulosic fibres. Hence, at least a fraction of the natural fibres may comprise lignocellulosic fibres. It is also conceivable that the natural fibres are formed by lignocellulosic fibres. Lignocellulosic fibres are typically microstructurally seen nonuniform along any three-dimensional orientation. This is a notable difference to synthetic fibres, like carbon and/or glass fibre. However, despite this non-uniformity of the natural fibres, they are surprisingly found to be able to form an effective reinforcing network within the core layer comprising magnesium oxide cement. Lignocellulosic fibres further benefit of being relatively cheap, in particular when compared to fiberglass.

The natural fibres may possibly comprise wood fibres. It is conceivable that the wood fibres are hardwood fibres or softwood fibres. However, it is also conceivable that a combination of hardwood fibres and softwood fibres is applied. The wood fibres may for example be pine, oak and/or poplar fibres. It is also conceivable that the natural fibres comprise bamboo fibres.

In a further preferred embodiment, the core layer comprises at least 30 wt % natural fibres. It is conceivable that the core layer comprises up to 60 wt % of natural fibres, preferably up to 50 wt %. Non-limitative examples are the core layer comprising between 25 and 45 wt % of natural fibres or between 30 and 40 wt % of natural fibres. Yet another non-limitative example is the core layer comprising between 15 and 25 wt % natural fibres, and preferably between 17 and 20 wt %.

The magnesium oxide cement comprises preferably at least 30 wt % magnesium oxide, and more preferably at least 40 wt %, and even more preferably at least 45 wt %. It is for example imaginable that the magnesium oxide cement comprises between 35 and 55 wt % magnesium oxide, preferably between 40 and 50 wt %. In a possible embodiment, the magnesium oxide cement comprises magnesium hydroxide. It is conceivable that at least part of the magnesium oxide is converted into magnesium hydroxide during the production process of the magnesium oxide cement. In yet further possible embodiment, the magnesium oxide cement may comprise a magnesium salt such as magnesium chloride (MgCl2) and/or magnesium sulphate (MgSO4). It is for example possible that the magnesium oxide cement comprises up to 30 wt % of magnesium chloride, and preferably up to 25 wt %, and/or up to 30 wt % of magnesium sulphate, and preferably up to 25 wt %. It is also conceivable that the magnesium oxide cement comprises both magnesium chloride and magnesium sulphate, preferably up to 30 wt %, and preferably up to 25 wt %. Preferably the magnesium oxide cement comprises a total of 5-15 wt % magnesium salt, most ideally 6-8 wt %. Most preferably the magnesium oxide cement comprises at least 5 wt % magnesium salt chosen from the groups of magnesium chloride, magnesium sulphate and magnesium phosphate.

It is also imaginable that at least one core layer at least partially comprises a magnesium crystal structure. The formation and microstructure of a magnesium oxide cement can be described in "crystal" or "hydration" phases and expressed in terms of a ternary system consisting of the ratio of magnesia, a magnesium salt such as magnesium sulphate or magnesium chloride, and water. Crystalline phases are formed upon curing into a ceramic compound and can be expressed in an abbreviated version referring to the molar ratio of each in the crystal formed. Magnesium oxysulphate cement, which uses the salt magnesium sulphate as a key binding material, can form two stable crystalline phases under ambient conditions; one of which is composed of the compounds magnesium oxide, magnesium sulphate and water, generally referred to as the 5-phase (also known as 5-1-3 phase, standing for $5Mg(OH)2·MgSO4·3H_2O$), and 3-phase (also known as 3-1-8 phase, standing for $3Mg(OH)2·MgSO4·8H_2O$). Magnesium oxychloride similarly can form two stable crystalline phases, generally referred to as the 3-phase (also known as 3-1-8 phase, standing for $3Mg(OH)2·MgCl2·8H_2O$), and 5-phase (also known as 5-1-8 phase, standing for $5Mg(OH)2·MgCl2·8H_2O$). Other phases can form under extreme pressures and temperatures but are not stable under livable temperatures.

It is also conceivable that the core layer and/or the magnesium oxide cement comprises at least one filler, such as but not limited to talc, calcium carbonate (CaCO3), perlite, polymer foam beads and/or a combination thereof. The core layer may for example comprise up to 15 wt % and preferably up to 10 wt % of fillers. The core layer and/or the magnesium oxide cement may also comprise at least one additive. At least one additive can for example be chosen from the group consisting of: a pigment, a colorant, an impact modifier, a lubricant, a stabilizer, a wax, an anti-halogen agent and/or an aid processing agent. The core layer may for example comprise up to 5 wt % of additive(s), preferably up to 2 wt %. A non-limiting example is the core layer comprising up to 1 wt %, preferably up to 0.5 wt % and more preferably up to 0.25 wt % ferric oxide (FeO3).

Typically, the core layer has a thickness between 3 and 30 mm. It is for example conceivable that the core layer has a thickness between 3 and 15 mm, in particular between 5 and 10 mm. Due to the outstanding material properties of the core layer, the panel can be relatively thin compared to conventional panel configured for the same purpose. In a further preferred embodiment, the core layer has a density in the range of 1375 to 1525 kg/m3, preferably in the range of 1400 to 1500 kg/m3. It is for example possible that the density of the core layer substantially equals 1400 kg/m3. Said density ranges are still found to provide good flexural and structural strength.

The core layer according to the present invention is found to be sufficiently strong for the provision of coupling parts. Hence, preferably, at least one pair of opposite side edges of the panel, and in particular of the core layer, is provided with complementary coupling parts. For example, the core layer comprises at least one pair of complementary coupling parts on at least two of its opposite side edges. Said coupling parts may for example be interlocking coupling parts configured for mutual coupling of adjacent panels on multiple directions. Preferably, said interlocking coupling parts provide locking in both horizontal and vertical directions. Any suitable interlocking coupling parts as known in the art could be applied. For example, said interlocking coupling parts may be in the form of complementary tongue and groove, male and female receiving parts, a projecting strip and a recess configured to receive said strip or any other suitable form. It is conceivable the mutually coupling parts require a downward scissoring motion when engaging, or are locked together by means of a horizontal movement. The complementary coupling means may even, according to the present invention, allow elastic deformation in order to be engaged and/or disengaged. In a preferred embodiment, at least one pair of complementary coupling parts is configured such that in a coupled state a pretension is existing. This pretension means that the complementary coupling parts exert forces onto each other in coupled state such that the complementary coupling parts, and thus the adjacent panels are forced towards another. The complementary coupling parts thereby co-act in a substantially clamping manner, resulting in a more reliable coupling of the adjacent panels. The pretension may also positively contribute to the stability of the adjacent panels in a coupled state. It is for example conceivable that the complementary coupling parts have at least partially overlapping contours.

Preferably, the panel comprises at least one decorative top layer attached to the upper core surface of the core layer and preferably at least one balancing layer attached to the lower core surface of the core layer. Preferably, said at least one decorative layer and at least balancing layer comprise at least one impregnated layer that generally comprise at least lignocellulose such as paper or wood veneer and/or a thermosetting or thermoplastic resin. The decorative top layer and balancing layers may for example be attached to the upper core surface and lower core surface respectively by means of a pressing process under high temperature and pressure, causing a definitive merging between the core and the top and/or bottom layers. The decorative top layer can for example comprise at least one décor layer and at least one protective layer. The décor layer may be formed by a decorative print which is printed directly on the upper core surface of the core layer.

Due to the core layer being relatively stable under several ambient conditions, and not sensitive to swelling, allows that a relatively large number of different top layers can be applied. Further non-limiting examples of possible decorative top layers which can be used are a PVC decorative film, a PP decorative film, and/or PET decorative film. The decorative top layer may also comprises a wear layer, preferably a transparent and/or thermoplastic wear layer. It is also conceivable that the decorative top layer comprises a stone or a wood veneer. In case a stone veneer is applied, the stone veneer preferably comprises a material selected from the group: natural stone, marble, granite, slate, glass and/or ceramic. The decorative top layer may for example comprise a ceramic tile. Due to the core layer according to the present invention having a good flexural and structural strength, the core layer is strong enough to be used in combination with a ceramic tile. This also applies to other relatively heavy top layers, wherein the core layer according to the present invention can provide sufficient support. In case a decorative top layer comprising ceramic is applied, the ceramic may be of a type selected from the group: monocuttura ceramic, monoporosa ceramic and/or porcelain ceramic. The ceramic may also be a multi-cased ceramic. It is also conceived that the decorative top layer comprises a high-pressure laminate (HPL), a plurality of impregnated layers, a decorative plastic or vinyl, linoleum, and/or decorative thermoplastic film. The balancing layer can for example comprise at least one acoustic layer, usually composed of a low density foamed layer of ethylene-vinyl acetate (EVA), irradiation-cross-linked polyethylene (IXPE), expanded polypropylene (XPP) and/or expanded polystyrene (XPS). It is also conceivable that such acoustic layer comprises nonwoven fibres, wherein possibly the acoustic layer can be made from natural fibres like hemp or cork. However, the acoustic layer may also comprise a recycled and/or recyclable material, such as PET and/or rubber. The density of this acoustic layer, if applied, preferably has a density between 65 kg/m3 and 300 kg/m3, most preferably between 80 kg/m3 and 150 kgm3. At least one backing layer may also be an adhesive layer in particular configured to attached the panel onto a surface. It is also imaginable that multiple balancing layers are applied or that the balancing layer is a combination of any of the said layers.

The invention also relates to a floor-, wall- and/or ceiling covering comprises a plurality of panels according to the present invention. The invention also relates to a panel, in particular a floor, wall or ceiling panel, comprising at least one core layer, the core layer comprising an upper core surface and a lower core surface and at least one pair of opposite side edges; wherein the core layer comprises magnesium oxide cement and at least 10 wt % of natural fibres dispersed in said magnesium oxide cement, wherein the magnesium oxide cement comprises at least 10 wt % magnesium oxide; and wherein the core layer has a density in the range of 1200 kg/m3 to 1600 kg/m3.

The invention also relates to a method for producing a panel, in particular a floor, wall or ceiling panel, preferably according to any of the previous claims, comprising the steps of:

a) forming a magnesium oxide cement damp composition comprising at least magnesium oxide and water,
b) subjecting the magnesium oxide cement damp composition to at least one sieving step;
c) applying at least one layer of the magnesium oxide cement damp composition upon a mould part; and
d) subjecting the layer of magnesium oxide cement damp composition to a force having a pressure of at least 7 MPa such that a core layer comprising an upper core surface and a lower core surface is obtained;
e) demoulding the obtained core layer; and
f) attaching at least one decorative top layer to the upper core surface of the layer, preferably by heat and/or pressure.

The steps of said method are generally subsequent steps. After the pressure of step d) is released, a core layer, or core board whereof multiple core layers can be formed, is obtained. The method according to the present invention allows to produce a core layer having a density in the range of 1200 kg/m3 to 1600 kg/m3, in particular between 1350 kg/m3 and 1550 kg/m3. The method also enables that a core layer can be obtained having a density which is substantially constant over the entire volume of the core layer.

This can at least partially be explained by the pressure applied at step d). A substantially constant density is also beneficial for the overall strength of the panel. Typically, the magnesium oxide cement damp composition is formed by mixing at least magnesium oxide powder, optionally natural fibres and water. The magnesium oxide cement damp composition is in practice a substantially powdery composition, which has a lower water content than a convention magnesium oxide cement slurry. The magnesium oxide cement damp composition is typically slightly wet but not soaked. Hence, the magnesium oxide cement damp composition can also be classified as textured composition. Preferably, the magnesium oxide cement damp composition is mixed prior to at least one sieving step. Mixing of the magnesium oxide cement damp composition may contribute to at least part of the natural fibres being encapsulated by magnesium oxide cement. During at least one sieving step a mesh size between 10 and 35 mm could for example be applied. The sieving step can for example be achieved by making use of a processor which preferably comprises brushes and/or sieves, for example sieves having a mesh size between 10 and 35 mm. It is also possible that multiple subsequent sieving steps are applied.

The method according to the present invention allows to achieve panels having a rather consistent quality, which can be at least partially explained by the clever combination of steps b) and d). These steps also at least partially prevent bubble formation and/or remove gas and/or bubbles present in the damp composition. Step d) enables the (chemical) reaction of the components of the magnesium oxide cement damp composition to finish and/or to cure the magnesium oxide cement damp composition. A further benefit of the method according to the present invention, is that where conventional magnesium oxide cement based panels are typically produced by a process using excessive water, the panel according to the present invention can produced via a more process water efficient method. In practice, this means that substantially less process water is used, and needed, during the production process and it also enables a significant reduction of the overall production time. Hence, no overload of water is applied during the production process, which is amongst others, beneficial from environmental point of view. Typically, a predetermined amount of water is applied for forming the magnesium oxide cement damp composition, wherein the amount is determined based upon the water required for the (chemical) reaction with magnesium oxide and optionally any further components and/or curing thereof. For example, the amount of water to be used can be controlled based upon the desired properties of the final product and the desired crystal structure in the core. More specifically, the amount of water in weight percentage or molar ratio added to the composition directly influences which crystal structure is formed in the core during the pressing phase.

Step d) of the method can for example be achieved via at least one pressing and/or compressing step. Step d) enables the removal of excessive liquid from the magnesium oxide cement damp composition. During step d), the magnesium oxide cement damp composition is typically dried and/or cured. The at least one sieving step enables that a more even magnesium oxide cement damp composition can be obtained.

Where it is referred to a mould part also a mould, conveyer, container and/or a plate can be meant. Basically, due to the magnesium oxide cement damp composition having a relatively functional structure, it is not required that the mould part comprises raised edges and/or a rim. Typically, the magnesium oxide cement damp composition has a relatively low moisture content, wherefore the damp composition does not behave like a liquid. This enables easier handling of the composition during processing thereof. Step c) may for example involve applying a layer which is at least partially 4 to 7 cm in thickness of the magnesium oxide cement damp composition in or upon the mould part. As indicated above, the method can also allow the production or core board whereof multiple core layers can be formed.

As indicated above, a core layer comprising magnesium oxide cement and natural fibres, may have a density in the range of 1350 kg/m3 to 1550 kg/m3a panel, resulting in a core layer having a relatively good flexural and structural strength.

Preferably, the magnesium oxide cement damp composition formed at step a) has a moisture content below 25%, preferably below 10%, more preferably at about 7%. It is for example possible that the magnesium oxide cement damp composition formed at step a) has a moisture content between 10 and 7%. It is possible to apply such relatively low moisture content due to the combination and/or fractions of materials used and the process steps applied in the present method. As indicated above, in the prior art it is known to produce magnesium oxide cement based panels via an extensive and time consuming process of drying of a magnesium oxide cement slurry, wherein the slurry contains at least 50 wt % of water, and often even over 60 wt % water. The need to use an overload of water is overcome by the method according to the present invention. The magnesium oxide cement damp composition may further comprise magnesium hydroxide, magnesium chloride and/or magnesium sulphate. The magnesium oxide cement damp composition may further comprises any of the additives and/or fillers as described for the present invention.

The magnesium oxides cement damp composition in step a) may comprise natural fibres. The magnesium oxides cement damp composition may for example comprises at least 30 wt % natural fibres. The natural fibres may comprise at least one element chosen from the group of: wood fibres, bamboo fibres, animal fibres, and/or mycelium fibres. The natural fibres may be any of the above described natural fibres and may be present in any of the above described volumes. The average length of the natural fibres may for example be at least 2 mm. The natural fibres may comprise lignocellulosic fibres, such as but not limited to wood fibres. The method is typically performed under ambient conditions. However, it is also conceivable that the method is performed under vacuum or under a predetermined pressure above atmospheric pressure. Step d) is typically performed for a duration of at least 2 hours, preferably at least 4 hours. Step d) is in a further preferred embodiment performed for a duration between 6 hours and 12 hours. In Step e), the panels can be demoulded after step d). The boards or panels typically have an initial strength that is at least 50% of the final strength after said duration intervals, and are the sufficiently strong to be further processed. Hence, the required process time is significantly shorter than the process times which are typically required for the production of a magnesium oxide based panel. Conventional processes for the production of a magnesium oxide based panel typically have a duration of at least seven days, which can be even longer in case a layer of fiberglass is included in the panel.

It is experimentally found that magnesium oxide and natural fibres effectively bond under pressure.

Step f) of the method is made possible due to the lack of density gradient in the panel, in particular in the core layer of the panel, which is a result of the pressure applied at step e) and the consistency of the damp composition d). The current method enables the production of a panel having a core layer with a density that is substantially constant over the entire volume of the core layer thereby increasing the overall strength thereof which allows the panel to withstand further application of heat and pressure without being damaged. With the core layer being free of any regions and/or zones having an increased density, which is typical of conventional magnesium oxide cement based panels, hot pressing of at least one layer of impregnated paper, or lignocellulose impregnated with a resin, to the upper and lower surfaces of the panel is made possible without causing the panel to warp or bend despite the core layer comprising magnesium oxide cement. Hot pressing of at least one layer of impregnated paper to the upper and lower surfaces of the panel is typically done by applying heat and pressure to the panel, more specifically to the core layer thereof. Optionally, the core layer can be subjected to a sanding process to increase adhesion prior to hot pressing. Preferably, the core layer is subjected to a temperature ranging from 100° C.-200° C., more preferably 170° C.-200° C., most preferably 175° C.-190° C. and to pressure ranging from 5-25 Mpa, more preferably 18-22 Mpa, most preferably around 20 Mpa. The application of heat and pressure to the core layer is conceived to last for at least 10 seconds to about 45 minutes, more preferably at least 30 seconds to about 90 seconds, most preferably at least 50 seconds to about 80 secs.

The method may also comprise the step of profiling and/or edging of at least one side edge of at least one panel, and in particular the core layer of the panel. Such step may for example involve that at least one pair of complementary coupling parts is provided at at least two opposite side edges of the panel, preferably wherein the complementary coupling parts are configured such that in a coupled state a pretension is existing. The method may for comprise a step of attaching at least one decorative top layer to the upper core surface of the core layer and/or attaching at least one balancing layer to the lower core surface of the core layer. Non-limiting examples of possible balancing layers and/or decorative top layers to be used are described above for the panel according to the present invention.

In a further possible embodiment, the layer of magnesium oxide cement damp composition is during step d) subjected to a force having a pressure between 7 MPa and MPa. It is for example also possible that the magnesium oxide cement damp composition is subjected to a force having a pressure below 18 MPa. The preferred pressure applied is at least partially dependent of the desired thickness and/or density of the final product.

The invention will be further elucidated by means of the following non-limitative clauses.

1. Decorative panel, in particular a floor, wall or ceiling panel, comprising:
    at least one core layer comprising an upper core surface, a lower core surface and at least one pair of opposite side edges;
    at least one decorative top layer attached to the upper core surface;
    wherein the core layer comprises magnesium oxide cement; and
    wherein the core layer has a density that is substantially homogeneous over its entire volume.
2. Panel according to clause 1, wherein at least one upper region of the core layer and/or at least one lower region of the core layer has a density that is less than 15%, more preferably less than 10%, most preferably less than 5% higher than the average density of the entire core layer.
3. Panel according to clause 2, wherein the upper region and/or the lower region extends into the core layer for about 0.1 mm to about 3 mm, preferably about 0.1 to about 1.5 mm, more preferably at least 0.1 mm to about 0.6 mm from the upper core surface and/or the lower core surface.
4. Panel according to clause 2 or clause 3, wherein the densities in the upper region of the core layer and the lower region of the core layer are substantially similar.
5. Panel according to any of the previous clauses, wherein the core layer has a density in the range of 1350 kg/m3 to 1550 kg/m3.
6. Panel according to any of the previous clauses, comprising at least one balancing layer attached to the lower core surface, wherein the balancing layer preferably comprises a thermoplastic or thermosetting resin and/or at least one ply of lignocellulose impregnated with a resin.
7. Panel according to any of the previous clauses, wherein the decorative top layer comprises a thermoplastic or thermosetting resin.
8. Panel according to any of the previous clauses, wherein the decorative top layer comprises at least one ply of lignocellulose impregnated with a resin.
9. Panel according to any of the previous clauses, wherein the magnesium oxide cement comprises at least 30 wt % magnesium oxide, preferably at least 40 wt %, and more preferably at least 45 wt %.
10. Panel according to any of the previous clauses, wherein the magnesium oxide cement comprises at least 5 wt % of at least one element chosen from the group of: magnesium chloride, magnesium sulphate, magnesium hydroxide and/or magnesium phosphate.
11. Panel according to any of the previous clauses, wherein the pair of side edges comprises interlocking coupling means.
12. Panel according to clause 11, wherein the interlocking coupling means is configured such that in a coupled state a pretension is existing.
13. Panel according to any of the previous clauses, wherein the core layer comprises at least 30 wt % of natural fibres, wherein the natural fibres are preferably dispersed in the magnesium oxide cement.
14. Panel according to clause 13, wherein the average length of the natural fibres is at least 2 mm.
15. Panel according to clause 13 or 14, wherein the natural fibres comprise at least one element chosen from the group of wood fibres, bamboo fibres, animal fibres, and/or mycelium fibres.
16. Method for producing a panel, in particular a floor, wall or ceiling panel, preferably according to any of the previous clauses, comprising the steps of:
    a) forming a magnesium oxide cement damp composition comprising at least magnesium oxide and water,
    b) subjecting the magnesium oxide cement damp composition to at least one sieving step;
    c) applying at least one layer of the magnesium oxide cement damp composition upon a mould part;
    d) subjecting the layer of magnesium oxide cement damp composition to a force having a pressure of at least 7 MPa such that a core layer comprising an upper core surface and a lower core surface is obtained;

e) removing the core layer from the mould part; and f) attaching at least one decorative top layer to the upper core surface of the layer, preferably by applying heat and/or pressure.

17. Method according to clause 16, wherein a balancing layer is applied to the lower core surface of the core layer under heat and pressure.

18. Method according to clause 16 or 17, wherein the decorative layer and/or balancing layer comprise a thermoplastic or thermosetting resin.

19. Method according to any of clauses 16 to 18, wherein the decorative top layer and/or balancing layer comprise at least one ply of lignocellulose impregnated with a resin.

20. Method according to any of clauses 16 to 19, wherein the magnesium oxide cement damp composition has a moisture content below 25%, preferably below 10%, more preferably at about 7%.

21. Method according to any of clauses 16 to 20, wherein the magnesium oxide cement damp composition comprises an element chosen from the group of: magnesium hydroxide, magnesium chloride, magnesium phosphate, and/or magnesium sulphate.

22. Method according to any of clauses 16 to 21, wherein step d) is performed for a duration between 2 hours and 12 hours.

23. Method according to any of clauses 16 to 22, wherein step d) is performed at a pressure between 7 MPa and 20 MPa.

24. Method according to any of clauses 16 to 23, wherein the magnesium oxides cement damp composition in step a) further comprises natural fibres.

25. Method according to any of clauses 16 to 24, wherein the magnesium oxides cement damp composition in step a) comprises at least 30 wt % natural fibres.

26. Method according to clause 24 or 25, wherein the average length of the natural fibres is at least 2 mm.

27. Method according to any of clauses 24 to 26, wherein the natural fibres comprise at least one element chosen from the group of: wood fibres, bamboo fibres, animal fibres, and/or mycelium fibres.

28. Method according to any of clauses 16 to 27, wherein in step f), the core layer is subjected to a temperature ranging from 100° C.-200° C., preferably 170° C.-200° C., more preferably 175° C.-190° C.

29. Method according to any of clauses 16 to 28, wherein in step f), the core layer is subjected to pressure ranging from 5-25 Mpa, preferably 18-22 Mpa, more preferably around 20 Mpa.

30. Method according to any of clauses 1 to 29, wherein in step f, the application of heat and pressure to the core layer is at least 10 seconds to about 45 seconds, preferably at least 30 seconds to about 90 seconds, more preferably at least 50 seconds to about 80 seconds.

It will be apparent that the invention is not limited to the examples described, but that numerous variants are possible within the scope of the attached claims that will be obvious to a person skilled in the art. It is not necessary to elaborate on examples of all conceivable combinations of the above-described inventive concepts, as a person skilled in the art will understand numerous inventive concepts can be (re) combined in order to arrive at a specific application.

The verb "comprise" and conjugations thereof used in this patent publication are understood to mean not only "comprise", but are also understood to mean the phrases "contain", "substantially consist of", "formed by" and conjugations thereof.

What is claimed is:

1. A floor, wall, or ceiling panel, comprising:
   at least one core layer, the core layer comprising an upper core surface and a lower core surface and at least one pair of opposite side edges;
   wherein the at least one core layer has a density in a range of 1350 kg/m³ to 1550 kg/m³ and comprises a cement comprising magnesium oxide and having a crystal structure expressed as a ternary system of magnesium oxide, a magnesium salt, and water;
   wherein the at least one core layer further comprises at least 20 wt % natural fibers disperse in said cement;
   wherein the natural fibers comprise fibers encapsulated by the cement and form an interconnected matrix with the cement crystals in the core layer;
   wherein the natural fibers form a reinforcing network across the entire volume of the core layer; and
   wherein the density of the core layer is substantially constant over the entire volume of the core layer, wherein the spatial variation of density is below 10% over the entire volume of the core layer.

2. The panel according to claim 1, wherein the average length of the natural fibers is at least 2 mm.

3. The panel according to claim 2, wherein the average length of the natural fibers is between 2 and 10 mm.

4. The panel according to claim 3, wherein the average length of the natural fibers is between 2 and 5 mm.

5. The panel according to claim 1, wherein at least one core layer does not contain a reinforcing layer or fiberglass.

6. The panel according to claim 1, wherein at least part of the upper core surface and/or at least part of the lower core surface has/have a density that is less than 5% higher than the density of the at least one core layer.

7. The panel according to claim 1, wherein the natural fibers comprise at least one chosen from the group consisting of: wood fibers, bamboo fibers, animal fibers, and/or mycelium fibers.

8. The panel according to claim 1, wherein the cement comprises the magnesium oxide in at least 30 wt %.

9. The panel according to claim 1, wherein the at least one core layer comprises at least 30 wt % natural fibers and up to 60 wt % natural fibers.

10. The panel according to claim 1, wherein the magnesium salt comprises magnesium chloride and/or magnesium sulphate.

11. The panel according to claim 1, wherein the cement comprises the magnesium chloride and/or magnesium sulphate in at least 30 wt %.

12. The panel according to claim 1, wherein the crystal structure comprises stable crystalline phases of a 3-phase form and/or a 5-phase form.

13. The panel according to claim 1, wherein the density of the at least one core layer is from 1400 to 1500 kg/m³.

14. The panel according to claim 1, wherein the at least one pair of opposite edges is provided with complementary coupling parts.

15. The panel according to claim 1, comprising at least one decorative layer on at least one surface of the at least one core layer.

16. The panel according to claim 15, wherein the decorative layer comprises a thermoplastic or thermosetting resin, at least one ply of lignocellulose impregnated with a resin, a decorative print printed directly on at least one surface of the core layer, a PVC decorative film, a PP decorative film, a PET decorative film, a stone veneer, a wood veneer, a high pressure laminate (HPL), a plurality of impregnated layers, a decorative plastic or vinyl, linoleum, a decorative thermoplastic film, an acoustic layer, and/or a transparent and/or thermoplastic wear layer.

17. The panel according to claim 1, wherein the at least one core layer comprises at least one filler chosen from the group consisting of: talc, calcium carbonate, perlite, polymer foam beads, and/or a combination thereof.

18. The panel according to claim 1, wherein the at least one core layer has a thickness between 3 and 10 mm.

19. The panel according to claim 1, wherein the at least one core layer comprises at least one compound chosen from the group consisting of: ferric oxide, silica fume, calcium chloride, calcium hydroxide, sodium hydroxide, aluminum sulphate and/or sodium carboxymethyl cellulose.

20. A method for producing the floor, wall, or ceiling panel according to claim 1, comprising the steps of:
   a) forming a magnesium oxide cement damp composition comprising at least the magnesium oxide, magnesium salt, natural fibers, and water;
   b) subjecting the magnesium oxide cement damp composition to at least one sieving step;
   c) applying at least one layer of the magnesium oxide cement damp composition upon a mold part; and
   d) subjecting the magnesium oxide cement damp composition to a force having a pressure of at least 7 MPa.

* * * * *

UNITED STATES PATENT AND TRADEMARK OFFICE
CERTIFICATE OF CORRECTION

Page 1 of 1

PATENT NO. : 12,371,379 B2
APPLICATION NO. : 18/347758
DATED : July 29, 2025
INVENTOR(S) : Baert et al.

It is certified that error appears in the above-identified patent and that said Letters Patent is hereby corrected as shown below:

On the Title Page

Applicant (71): Delete "Champion Link International Corporation, The Valley (AL)" and insert
-- Champion Link International Corporation, The Valley (AI) --

Signed and Sealed this
Third Day of February, 2026

John A. Squires
*Director of the United States Patent and Trademark Office*